June 5, 1934.  C. E. ROBINSON  1,961,170
RECORDING THE WAVE LENGTH TO WHICH A RADIO SET IS TUNED
Filed Nov. 7, 1929
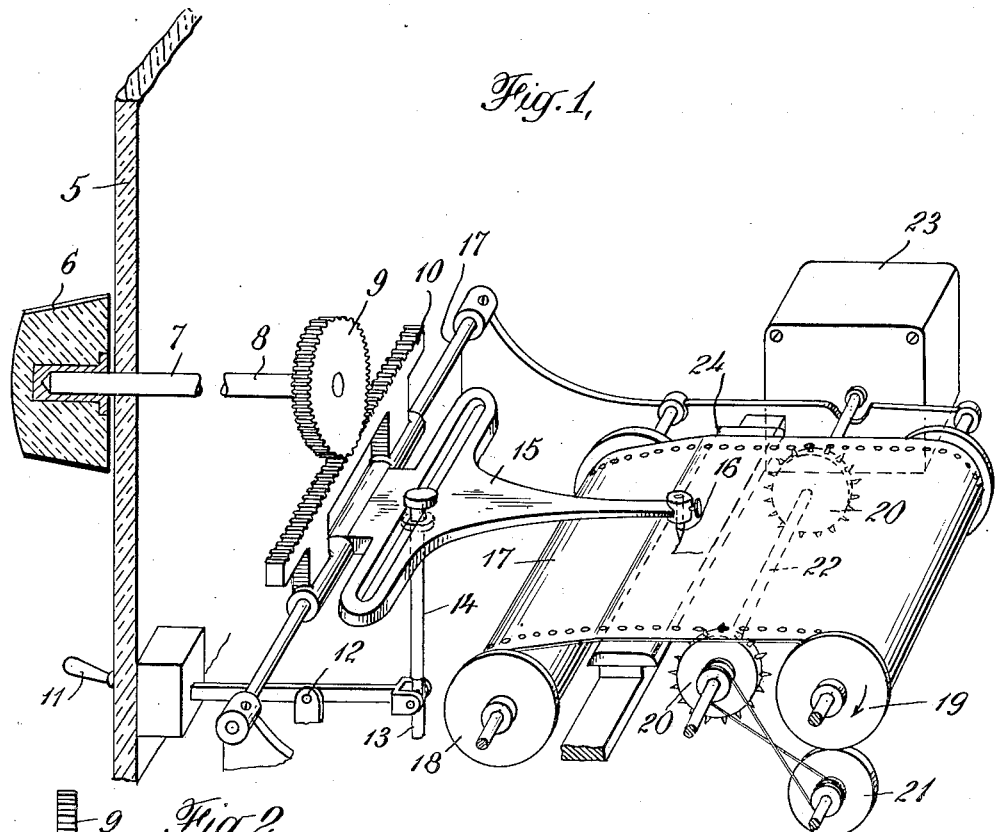
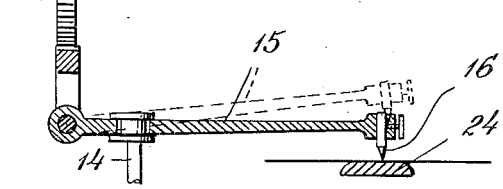
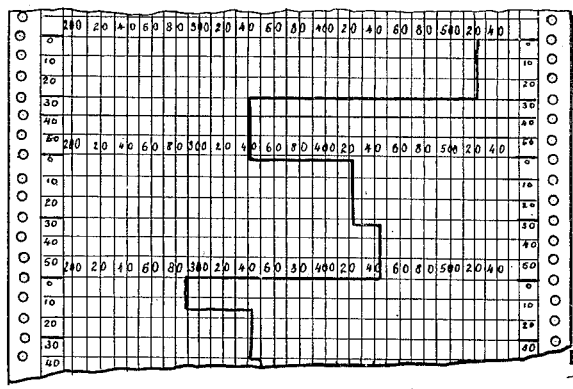
INVENTOR
Claude E. Robinson
BY
Pennie Davis Marvin & Edmonds
ATTORNEYS Patented June 5, 1934

1,961,170

UNITED STATES PATENT OFFICE 1,961,170

RECORDING THE WAVE-LENGTH TO WHICH A RADIO SET IS TUNED

Claude E. Robinson, Tenafly, N. J., assignor to Radio Corporation of America, a corporation of Delaware Application November 7, 1929, Serial No. 405,385

3 Claims. (Cl. 34—1)

This invention relates to a radio tuning recorder for use in connection with a radio receiving set and to the method of operating the same, and more particularly to the operation of a plurality of radio tuning recorders over any selected period of time to make a comparative record of the wave lengths to which various radio receiving sets are operated during that time. The invention includes both the apparatus and the method of operation.

It is an object of the present invention to provide a device for producing a record indicating the wave lengths or frequencies to which a receiver has been tuned when it is turned on, the time of day when it is turned on and the length of time it is turned on.

It is another object of the invention to record the time during which a receiving set is operated, and more particularly the wave lengths to which one or more receiving sets are tuned during the time that they are operated.

It is a further object of the invention to provide for scientifically measuring the broadcast listener response by making a comparative record of the wave lengths or broadcasting stations to which each of a plurality of receiving sets is tuned over a selected period of time. By staking out a geographical or population area for a survey, and taking a radio census to determine who the radio listeners are, and then providing radio receiving sets equipped with tuning recorders for a selected sample of these listeners, a comparative record will be made which will be a scientific measurement of listener response. The relative popularity of programs being broadcast from different broadcasting stations will be recorded. The record will show the length of time during which each of the sets is operated, the wave-lengths to which each of the sets is tuned, the length of time during which each set is tuned to each wave-length, the hour of the day during which each set is operated and the various programs that the set is tuned to receive.

According to this invention the wave-length to which each of a plurality of receiving sets is tuned may be recorded and this may advantageously be done by making a permanent record on a tape or chart of the wave-length to which each of the receiving sets is tuned over a selected period of time. Where a comparative record is made by radio tuning recorders connected with a plurality of receiving sets, the means for recording the passage of time at the various recorders are so synchronized that the number of receiving sets tuned to each wave-length can be determined for any period of time and the length of time and hour of day during which each receiving set is tuned to any one station is recorded on a comparative basis.

A tuning recorder is provided in combination with each of the various receiving sets to be covered by the comparative record. The tuning recorder may comprise means for making a permanent record on a separate chart or tape or other recording blank at each receiving set, or several or all of the sets may be connected as by electrical means with a central recording station at which the records for several or all of the receiving sets is compiled. Where a separate tuning recorder is provided in connection with each receiving set it may comprise a punching or marking device adapted to indicate on a moving tape or chart or other recording blank the wave-length to which the set is tuned at all times during any selected interval of time or at regular intervals during this selected interval. The record may be made on a chart on which the passage of time is charted in advance of its use in the recorder as where the record is made as a graph and the passage of time is plotted as one of the ordinates. As an alternative arrangement the passage of time may be indicated by printing on a recording tape, etc. the time at which each record of the wave-length to which the receiving set is tuned is made. The recording of the passage of time at all of the receiving sets for which a comparative record is being made is synchronized so that the wave-length which is recorded at all of the sets at any one time or over any period of time may be determined by later observing the records for the various sets.

The tuning recorder is advantageously placed in operating connection with the tuning mechanism of a receiving set. In a receiving set so constructed that the tuning is accomplished by the movement of a single dial the recorder is advantageously adapted to be actuated by the turning of the dial. On the shaft to which the dial is fastened, or geared with this dial or with this shaft, means may be provided for changing the position of a recording pen or stylus. The recording pen or stylus is then so connected with the tuning dial that as the dial is turned the position of the recording pen is correspondingly changed so that the broadcasting station or wave-length which the set is tuned to receive may be determined by noting the position of the pen or stylus. With a recording pen or stylus connected in this way to the tuning dial a timed record may readily be prepared on graph paper which is moved at a uniform rate under the pen or stylus. The passage of time is plotted along one axis of the paper and by causing the recording pen or stylus to move across this axis the wave-length to which the receiving set is tuned will be recorded on the other axis. The graph paper may be moved under the recording pen continuously regardless of whether the radio set is operating and the recording pen and the paper may be moved in and out of contact with one another by mechanism connected with the switch adapted to turn the radio set on and off so as to record the wave-lengths only when the receiving set is turned on.

By synchronizing the recording of the passage of time at all of the recorders, a comparative record is prepared which accurately indicates the wave-length to which each of the receiving sets is tuned at any one time, the length of time during which each of the sets is tuned to any wave-length, and the length of time during which each set is tuned to any wave-length as well as the time at which the greatest number of sets is tuned in to any one wave-length, or the time at which the greatest number of sets is tuned to any wave-length and also the relative number of sets tuned to any wave-length at any one time or at all times.

By providing receiving sets equipped with tuning recorders where they will be operated by a selected sample of radio listeners, an accurate comparative record may be obtained which will indicate the relative popularities of various programs broadcast from broadcasting stations employing different wave-lengths at the same time and at different times, and the relative popularity of all programs being broadcast and the most popular time for tuning any program or to programs of any one general type. In fact by applying my invention a comparative record may be prepared measuring scientifically the popularity of the various radio programs being broadcast.

The invention will be further described in connection with the accompanying drawing, but it is intended and is to be understood that the invention is not limited thereto:

Fig. 1 shows one type of radio tuning recorder;
Fig. 2 is a detail of Fig. 1; and
Fig. 3 is a section of a chart showing the record made.

In the drawing 5 indicates the front panel of any radio set which may be tuned by the adjustment of a single tuning dial 6. The tuning dial is mounted on the shaft 7. Beyond the condenser or other tuning mechanism located on this shaft is an extension 8 of the shaft on which the pinion 9 is located. The rack 10 meshes with this pinion 9 and as the tuning dial 6 is turned the rack 10 moves horizontally in a direction parallel with the panel 5.

A switch 11 is provided for turning the radio set on and off. The switch is pivoted at 12. The arm 13 is connected with means for turning the receiving set on and off and the link 14 raises and lowers the support 15 as the switch is turned on and off. This support holds a stylus 16.

The rack 10 slides laterally on the shaft 17 as the tuning dial is turned. As the rack moves on this shaft it moves the support 15, which, in turn, changes the position of the stylus. When the receiving set is turned off the support 15 is in the raised position shown in dotted lines in Fig. 2, and the stylus does not contact with the chart 17. When the receiving set is turned on the stylus 16 contacts with the chart, which is made of graphic paper, and the position of the stylus is recorded. As the tuning dial is turned the position of the stylus 16 on the chart is changed.

The chart 17 is wound off of the drum 18 on to the drum 19 by the cog wheels 20 and the friction gears 21, which are driven by the shaft 22, which is turned by the timing mechanism 23. The chart passes under the stylus at a uniform rate and is supported by the writing table 24. Time is indicated along the margin of the chart and wave-lengths are indicated across the chart. By the movement of the stylus an accurate record is made of the length of time the receiving set is turned on, the various wave-lengths to which it has been tuned and the time at which it is tuned to each wave-length.

Fig. 3 is representative of the type of curve that the radio tuning recorder here shown may plot. Time is indicated along the margin. Indicia characterizing various broadcasting stations as, for instance, wave-lengths is indicated across the chart.

When a comparative record of the charts made by a plurality of radio timing recorders is made, the various timing means must be synchronized. Separate time clocks may be employed at each recorder, but in this case care should be taken to see that the clocks are accurately set. It may be advantageous to operate the timing mechanism of all of the recorders from some central station.

In the specification and claims the terms "radio receiving set" and "radio tuning recorder" are used in a broad sense to include a radio receiving set adapted to receive television waves as well as sound waves and a recorder for such waves.

I claim:

1. In a radio broadcast receiver of the type including a tuning device adapted for adjustment of the receiver tuning instrumentality and a receiver "on-off" control switch independent of the said device and a clock operated means for moving a program record strip provided with broadcast frequency and time indicia at a predetermined rate, a stylus, means mechanically coupling said tuning device and the stylus whereby adjustment of said tuning device to select a broadcast frequency results in actuation of the stylus to produce on said strip a record relating said indicia to indicate the broadcast receiver listener's response to broadcast programs, and an additional means mechanically coupling the switch and first means to move the stylus into a position wherein it is inoperative to produce said record when the switch is adjusted to "off" position.

2. An arrangement for recording the response of a broadcast receiver listener, the receiver being of a type including a manually operable rotatable tuning knob arranged for adjustment of the tuning instrumentality of the receiver, said arrangement comprising a timing mechanism for moving a record sheet at a predetermined rate, said sheet being provided with time and broadcast frequency indicia, a stylus disposed in record producing position with respect to the moving sheet, and means, responsive to adjustment of the tuning knob, for displacing the stylus in a direction transverse to the direction of movement of the sheet to produce on the sheet a record relating said indicia to indicate the said response.

3. An arrangement for recording the response of a broadcast receiver listener, the receiver being of a type including a manually operable rotatable tuning knob arranged for adjustment of the tuning instrumentality of the receiver, said arrangement comprising a timing mechanism for moving a record sheet at a predetermined rate, said sheet being provided with time and broadcast frequency indicia, a stylus disposed in record producing position with respect to the moving sheet, and means responsive to adjustment of the tuning knob, for displacing the stylus in a direction transverse to the direction of movement of the sheet to produce on the sheet a record relating said indicia to indicate the said response, and an additional means, independent of said knob, for moving the stylus at will out of said record producing position.

CLAUDE E. ROBINSON.